(12) United States Patent
Malmassari et al.

(10) Patent No.: US 10,759,324 B2
(45) Date of Patent: Sep. 1, 2020

(54) BOOM HOSE APPARATUS

(71) Applicant: Federal Signal Corporation, Oak Brook, IL (US)

(72) Inventors: Joshua Lee Malmassari, La Salle, IL (US); Xiaolun Huang, Naperville, IL (US)

(73) Assignee: Federal Signal Corporation, Oak Brook, IL (US)

( * ) Notice: Subject to any disclaimer, the term of this patent is extended or adjusted under 35 U.S.C. 154(b) by 256 days.

(21) Appl. No.: 15/899,244

(22) Filed: Feb. 19, 2018

(65) Prior Publication Data

US 2019/0255981 A1 Aug. 22, 2019

(51) Int. Cl.
| | | |
|---|---|---|
| *A01G 20/47* | (2018.01) | |
| *A47L 9/00* | (2006.01) | |
| *A47L 9/24* | (2006.01) | |
| *E01H 1/08* | (2006.01) | |
| *E01C 19/47* | (2006.01) | |
| *E03F 7/10* | (2006.01) | |
| *E02F 7/02* | (2006.01) | |
| *F16L 3/01* | (2006.01) | |
| *B60P 1/60* | (2006.01) | |
| *E02F 3/88* | (2006.01) | |
| *E02F 3/90* | (2006.01) | |

(52) U.S. Cl.
CPC ............... *B60P 1/60* (2013.01); *A01G 20/47* (2018.02); *A47L 9/009* (2013.01); *A47L 9/244* (2013.01); *A47L 9/248* (2013.01); *E01C 19/475* (2013.01); *E01H 1/0827* (2013.01); *E03F 7/106* (2013.01); *E01H 2001/0881* (2013.01); *E02F 3/8816* (2013.01); *E02F 3/90* (2013.01); *E02F 7/02* (2013.01); *F16L 3/01* (2013.01)

(58) Field of Classification Search
CPC .......... B60P 1/60; E01C 19/475; E03F 7/106; A01G 20/47; A47L 9/009; A47L 9/244; A47L 9/248; E01H 1/0827; E01H 2001/0881; E02F 3/8816; E02F 3/90; E02F 7/02; F16L 3/01
See application file for complete search history.

(56) References Cited

U.S. PATENT DOCUMENTS

| | | |
|---|---|---|
| 6,792,646 B1 | 9/2004 | Greene et al. |
| 7,712,481 B1 | 5/2010 | Mayer et al. |
| 2002/0020760 A1 | 2/2002 | Beggs |
| 2010/0018590 A1 | 1/2010 | Damaske et al. |
| 2015/0075624 A1 | 3/2015 | Mahaffa et al. |

FOREIGN PATENT DOCUMENTS

WO 9703321 A1 1/1997

OTHER PUBLICATIONS

International Search Report and Written Opinion for Application No. PCT/US2019/016060 dated Sep. 4, 2019, 22 pages.
Invitation to Pay Additional Fees for PCT Application No. PCT/US2019/016060, dated May 22, 2019, 14 pages.

*Primary Examiner* — David Redding
(74) *Attorney, Agent, or Firm* — Merchant & Gould P.C.

(57) ABSTRACT

A boom hose apparatus for a material collection vehicle includes a telescoping boom assembly and a hose assembly supported by the boom assembly. The boom assembly includes a plurality of telescoping conduits. A flexible hose is received through the telescoping conduits and can slidably extend from, or retract into, the conduits independently from the telescoping of the conduits.

20 Claims, 15 Drawing Sheets

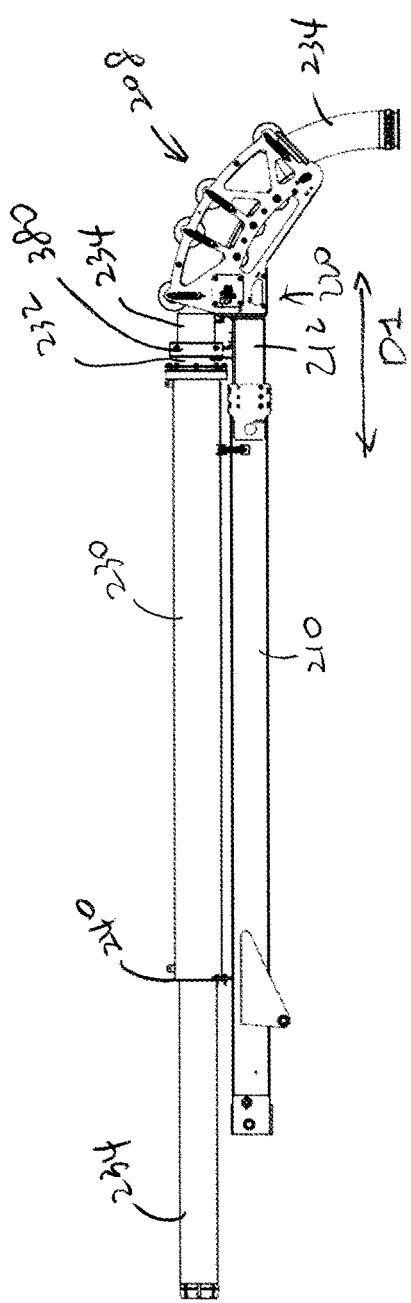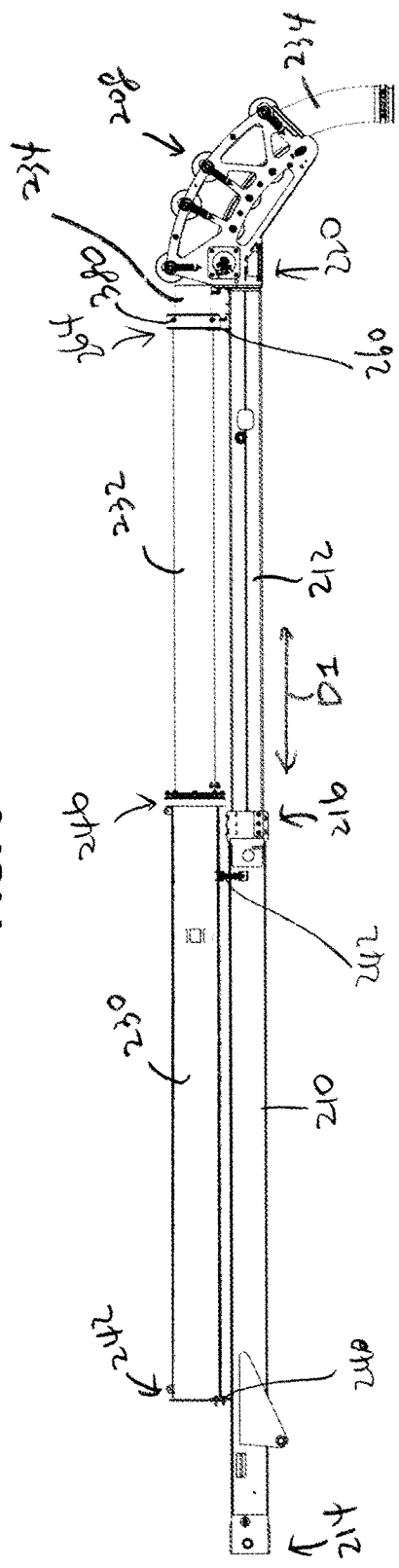

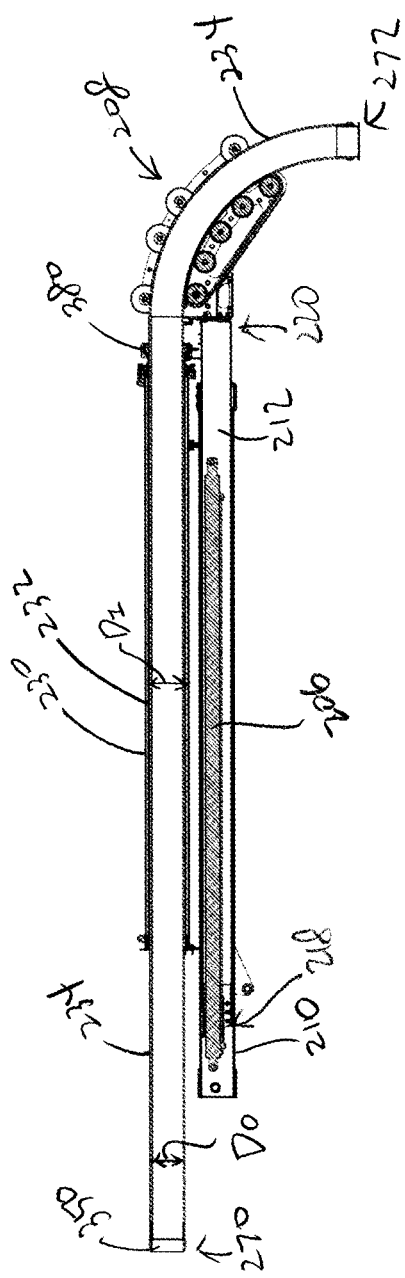
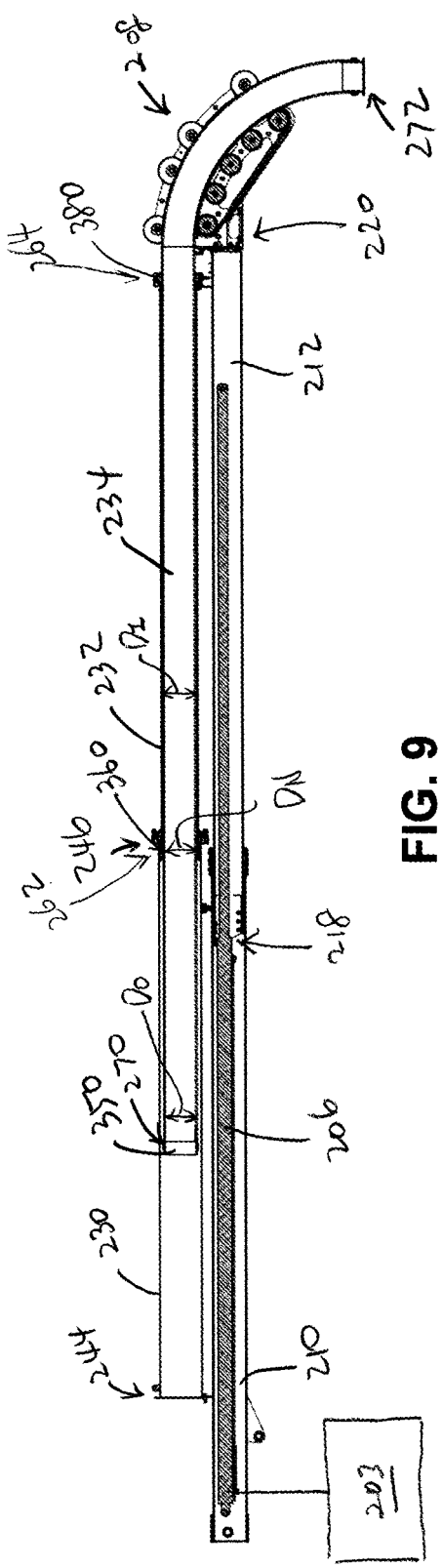
FIG. 8
FIG. 9

BOOM HOSE APPARATUS

BACKGROUND

Tank trucks for collecting and transporting flowable refuse materials, such as storm drain sewage, septic tank sewage, certain chemical waste, leaves and the like, are typically equipped with a collection tank, a vacuum pump, and an at least partially flexible suction hose having one end connected to the tank and an opposite end (i.e., distal end) including a refuse pick-up nozzle. The suction hose may be supported by an adjustable boom on the truck so that at a site of refuse pick-up, the nozzle may be manipulated and positioned relative to the parked truck. For efficient and safe operations, it is desired to provide the ability to adjust the length of the suction hose between the tank of the truck and the pick-up nozzle.

SUMMARY

In general terms, the present disclosure is directed to a boom hose apparatus. In one possible configuration and by non-limiting example, the boom hose apparatus is configured for a vehicle and provides features for adjusting the length and position of a flexible hose. Various aspects are described in this disclosure, which include, but are not limited to, the following aspects.

One aspect is a boom hose apparatus for a vehicle. The boom hose apparatus includes a boom assembly and a hose assembly. The boom assembly includes a first boom section and a second boom section telescopically movable relative to the first boom section. The hose assembly is supported on the boom assembly and includes a first conduit, a second conduit, and a flexible hose. The first conduit is mounted to the first boom section and fluidly connected to a collection tank of the vehicle. The second conduit is mounted to the second boom section and telescopically movable relative to the first conduit as the second boom section telescopically moves relative to the first boom section. The flexible hose is received through the second conduit and configured to slidably extend at least partially from the second conduit or retract at least partially into the second conduit.

In certain examples, the boom hose assembly includes a hose drive assembly configured to drive the flexible hose to extend from the second conduit or retract into the second conduit. The hose drive assembly is mounted to the second boom section and movable along with the second boom section as the second boom section telescopically moves relative to the first boom section.

In certain examples, the hose drive assembly includes a housing secured to a front end of the second boom section; a conveyor device arranged in the housing and configured to provide a hose conveyance path along which the flexible hose moves; and a drive motor mounted to the housing and driving the conveyer device. In certain examples, the hose drive assembly further includes one or more idler rollers supported by the housing and arranged opposite to the conveyor device along the hose conveyance path, the idler rollers being biased toward the conveyor device to bias the flexible hose against the conveyor device.

In certain examples, the boom hose assembly includes a boom drive assembly configured to drive the second boom section to telescopically move relative to the first boom section.

In certain examples, the boom hose assembly includes a hose end stopper secured to a rearward end of the flexible hose and engageable with a front end of the second conduit to limit movement of the flexible hose relative to the second conduit. In certain examples, the second conduit may have a conduit inner diameter and has a neck portion having a neck inner diameter, the neck inner diameter smaller than the conduit inner diameter. The hose end stopper includes a head portion and a hose fit portion fitted at the rearward end of the flexible hose. The head portion has an external diameter larger than an outer diameter of the flexible hose. The external diameter of the head portion is smaller than the conduit inner diameter of the second conduit and greater than the neck inner diameter of the second conduit.

In certain examples, the boom hose assembly includes a hose clamp device that selectively enables or disable movement of the flexible hose relative to the second conduit. In certain examples, the hose clamp device is arranged at a front end of the second conduit. In certain examples, the hose clamp device includes an inflatable bladder arranged to at least partially surround the flexible hose.

Another aspect is a vehicle including a collection tank, a boom hose assembly, a boom drive assembly, a hose drive assembly, and a boom hose controller. The boom hose apparatus includes a boom assembly and a hose assembly. The boom assembly includes a first boom section and a second boom section telescopically movable relative to the first boom section. The hose assembly is supported on the boom assembly and includes a first conduit, a second conduit, and a flexible hose. The first conduit is mounted to the first boom section and fluidly connected to a collection tank of the vehicle. The second conduit is mounted to the second boom section and telescopically movable relative to the first conduit as the second boom section telescopically moves relative to the first boom section. The flexible hose is received through the second conduit and configured to slidably extend at least partially from the second conduit or retract at least partially into the second conduit. The boom drive assembly is configured to drive the second boom section to telescopically move relative to the first boom section. The hose drive assembly is configured to drive the flexible hose to extend from the second conduit or retract into the second conduit. The boom hose controller is configured to receive a user input for controlling the boom driver and the hose drive assembly.

In certain examples, the hose drive assembly is mounted to the second boom section and movable along with the second boom section as the second boom section telescopically moves relative to the first boom section.

In certain examples, the hose drive assembly includes a housing secured to a front end of the second boom section; a conveyor device arranged in the housing and configured to provide a hose conveyance path along which the flexible hose moves; and a drive motor mounted to the housing and driving the conveyer device. In certain examples, the hose drive assembly further includes one or more idler rollers supported by the housing and arranged opposite to the conveyor device along the hose conveyance path, the idler rollers being biased toward the conveyor device to bias the flexible hose against the conveyor device.

In certain examples, the vehicle includes a hose end stopper secured to a rearward end of the flexible hose and engageable with a front end of the second conduit to limit movement of the flexible hose relative to the second conduit. In certain examples, the second conduit has a conduit inner diameter and has a neck portion having a neck inner diameter, the neck inner diameter smaller than the conduit inner diameter. The hose end stopper includes a head portion and a hose fit portion fitted at the rearward end of the flexible hose. The head portion has an external diameter larger than an outer diameter of the flexible hose. The external diameter of the head portion is smaller than the conduit inner diameter of the second conduit and greater than the neck inner diameter of the second conduit.

In certain examples, the vehicle includes a hose clamp device that selectively enables or disable movement of the flexible hose relative to the second conduit. In certain examples, the hose clamp device is arranged at a front end of the second conduit. In certain examples, the hose clamp device includes an inflatable bladder arranged to at least partially surround the flexible hose.

In certain examples, the boom hose apparatus is connected to a body of the vehicle and pivotable horizontally and vertically relative to the vehicle.

Yet another aspect is a flexible hose for a boom hose apparatus. The boom hose apparatus includes a telescoping boom assembly and a hose assembly supported by the telescoping boom assembly. The hose assembly includes a first conduit and a second conduit telescopically movable relative to the first conduit. The flexible hose is slidably moveable through the second conduit. The flexible housing includes a rearward end, a forward end, and a hose end stopper. The rearward end is in fluid communication with a collection tank. The forward end is opposite to the rearward end and extends out from the second conduit. The hose end stopper is secured to the rearward end and engageable with a front end of the second conduit to limit movement of the flexible hose relative to the second conduit.

In certain examples, the second conduit has a conduit inner diameter and has a neck portion having a neck inner diameter, the neck inner diameter smaller than the conduit inner diameter. The hose end stopper includes a head portion and a hose fit portion fitted at the rearward end of the flexible hose. The head portion has an external diameter larger than an outer diameter of the flexible hose. The external diameter of the head portion is smaller than the conduit inner diameter of the second conduit and greater than the neck inner diameter of the second conduit.

In certain examples, the flexible hose includes a coupling element arranged at the forward end of the flexible hose and configured to attach one or more accessories.

Yet another aspect is a boom hose apparatus for a vehicle. The boom hose apparatus includes a boom assembly and a boom assembly. The boom assembly includes a first boom section and a second boom section telescopically movable relative to the first boom section. The boom assembly is supported on the boom assembly and includes a first conduit and a second conduit. The first conduit is mounted to the first boom section and fluidly connected to a collection tank of the vehicle. The second conduit is mounted to the second boom section and telescopically movable relative to the first conduit as the second boom section telescopically moves relative to the first boom section. The second conduit is configured to slidably receive a flexible hose that is operated to extend at least partially from the second conduit or retract at least partially into the second conduit.

BRIEF DESCRIPTION OF THE DRAWINGS

FIG. 6 is a side view of the boom hose apparatus of FIG. 4 in a first state.

FIG. 7 is a side view of the boom hose apparatus of FIG. 4 in a second state.

FIG. 8 is a side cross sectional view of the boom hose apparatus of FIG. 6.

FIG. 9 is a side cross sectional view of the boom hose apparatus of FIG. 7.

DETAILED DESCRIPTION

Figure 1:
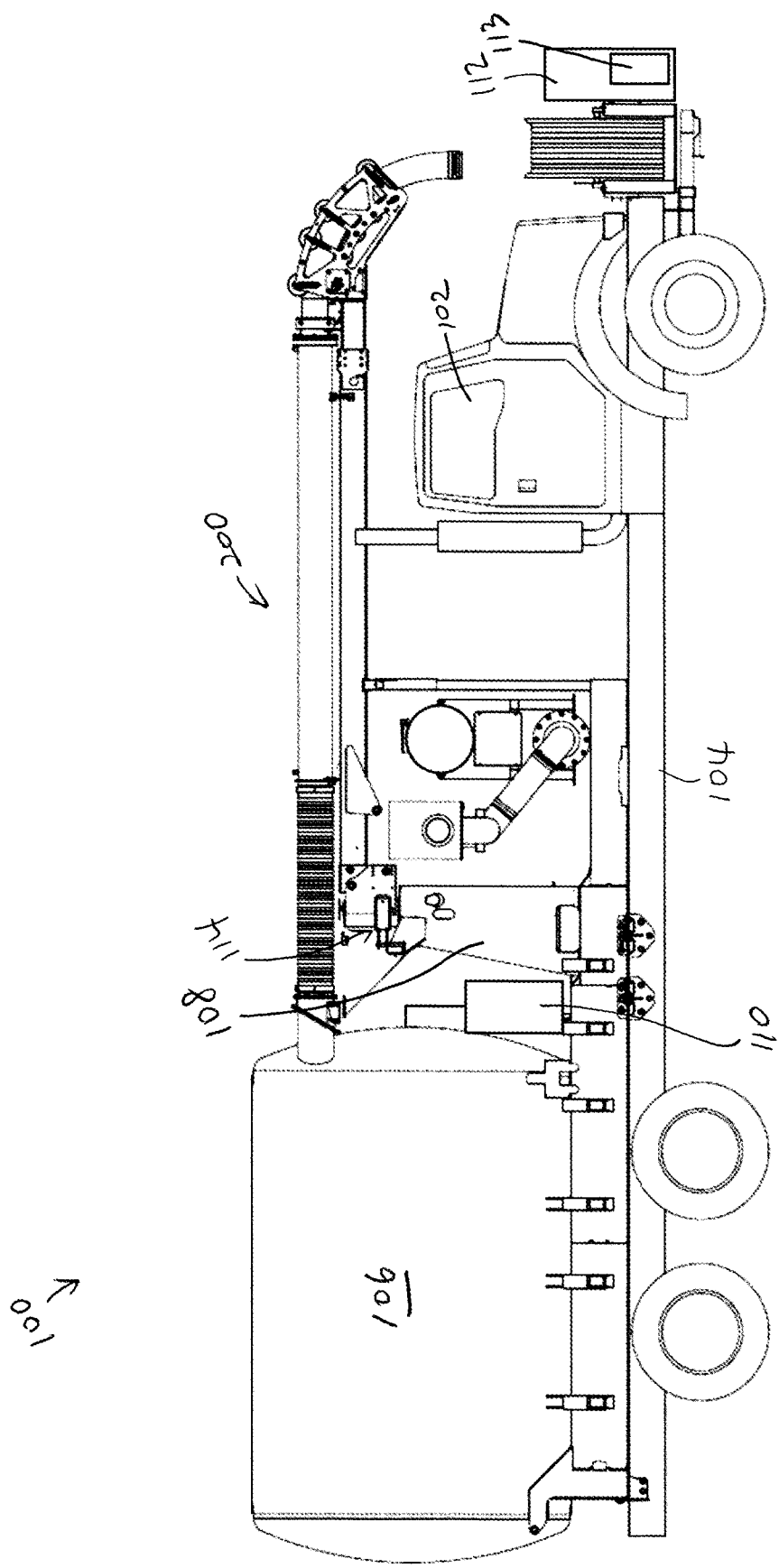
FIG. 1 illustrates an example material collection vehicle.
Figure 2:
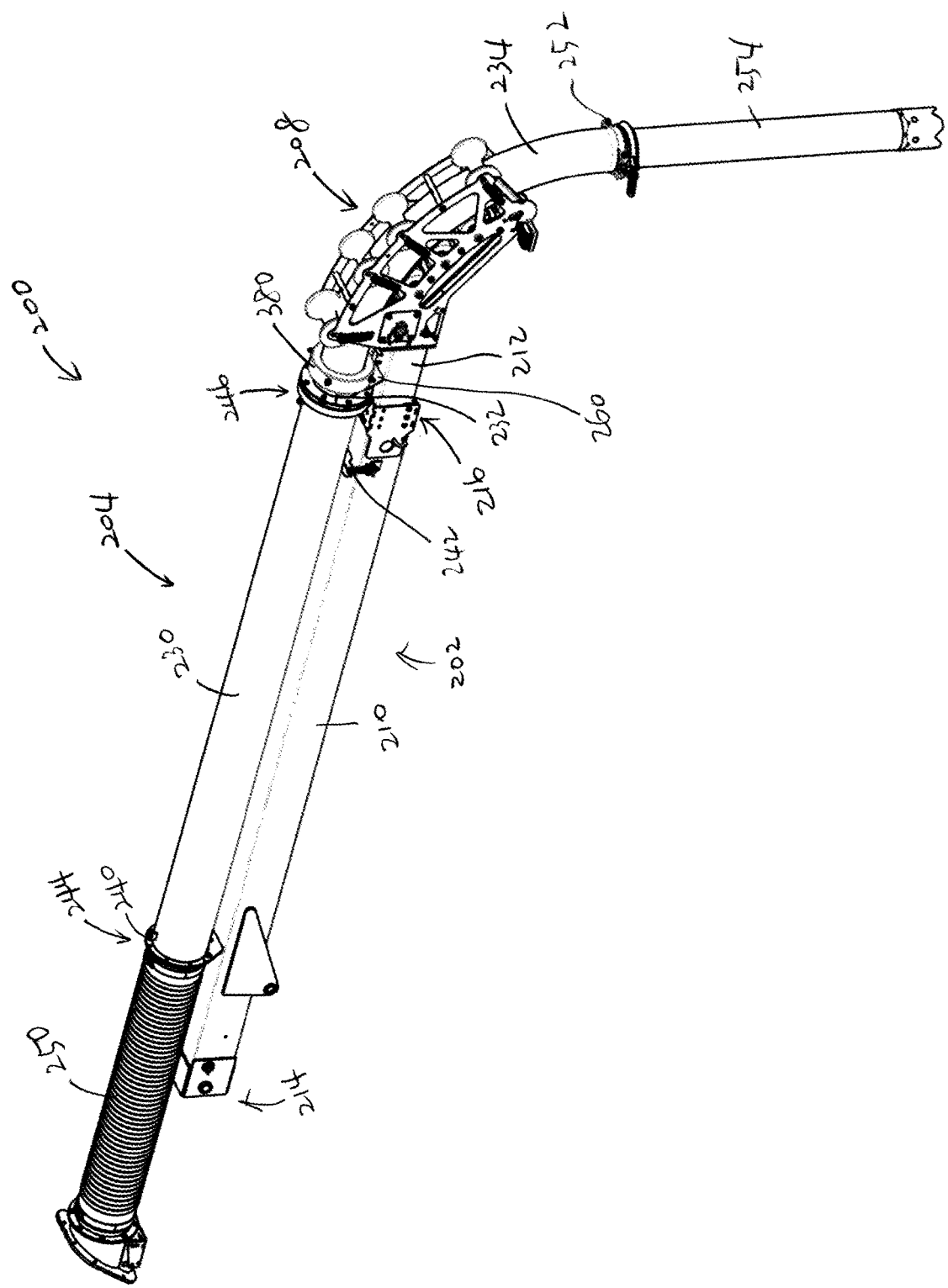
FIG. 2 is a perspective view of an example boom hose apparatus with associated components.
Figure 3:
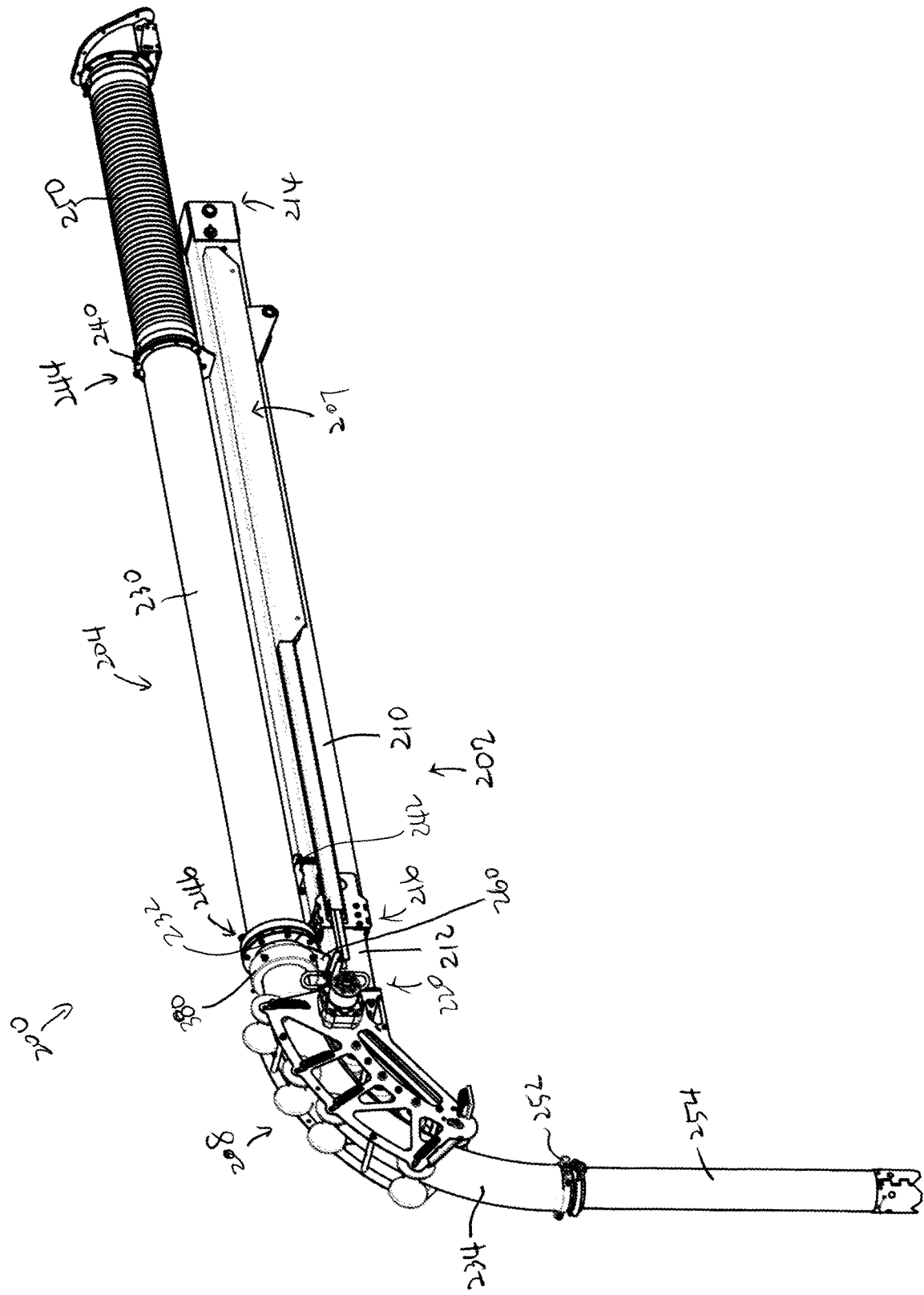
FIG. 3 is another perspective view of the boom hose apparatus of FIG. 2.
Figure 4:
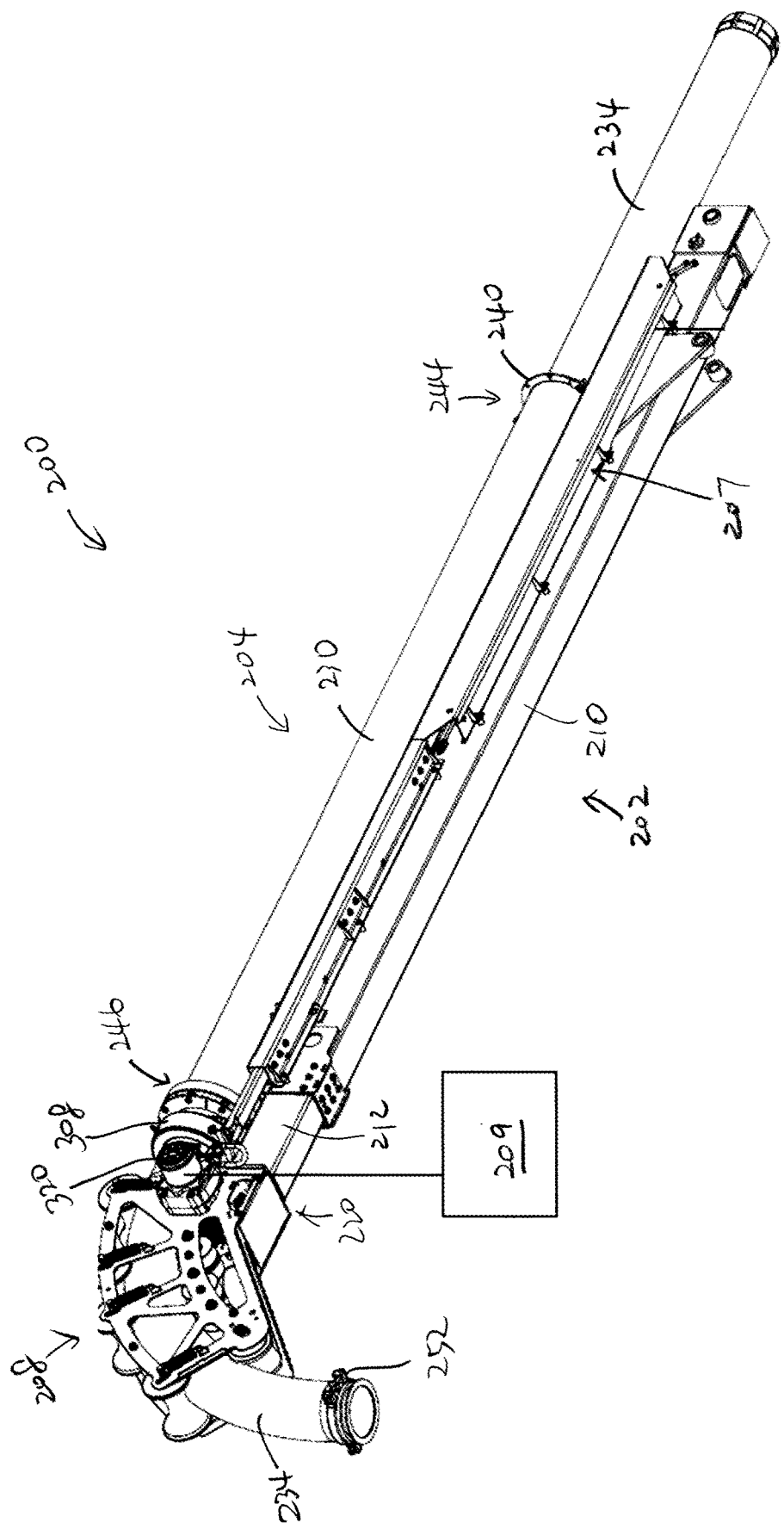
FIG. 4 is a perspective view of the boom hose apparatus without the associated components.
Figure 5:
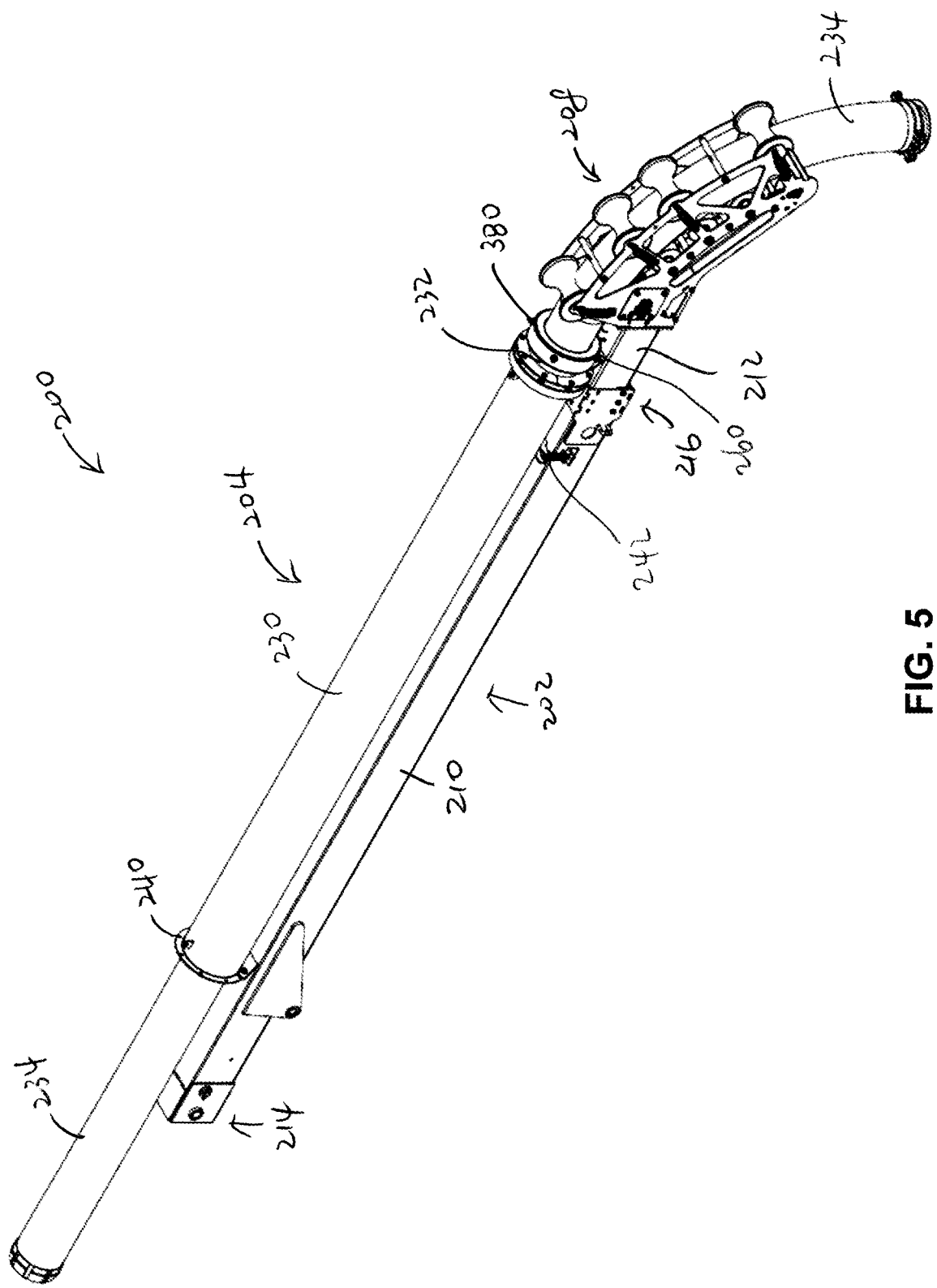
FIG. 5 is another perspective view of the boom hose apparatus of FIG. 4.

Various embodiments will be described in detail with reference to the drawings, wherein like reference numerals represent like parts and assemblies throughout the several views.

In general, a boom hose apparatus is provided for a vehicle with a collection tank. The boom hose assembly includes a telescoping boom assembly and a hose assembly supported by the boom assembly. The boom assembly includes a plurality of telescoping conduits. A flexible hose is received through the telescoping conduits and can slidably extend from, or retract into, the conduits independently from the telescoping of the conduits.

Referring to FIG. 1, a vehicle is described in accordance with an exemplary embodiment of the present disclosure. The vehicle is generally designated by reference number 100 and can also be referred to herein as a material collection vehicle or cleaning vehicle. The vehicle 100 can be of various types. Examples of the vehicle 100 include a dump truck, a vehicle for sewer cleaning or storm drain cleaning, a catch basin cleaning vehicle, a vacuum excavating vehicle, vehicles for leaf collection, litter collection, or hydroexcavation, and any other vehicles having a tank or body for containing a material.

The material collection vehicle 100 includes a cab 102, a vehicle body 104, and a collection tank 106 (also referred to herein as a debris body) mounted to the vehicle body 104. The material collection vehicle 100 further includes a boom hose apparatus 200 that is mounted to a boom support structure 108 configured to operatively support the boom hose apparatus 200.

The collection tank 106 is used to collect a material, such as debris, sludge, solids, liquids, slurries, and other materials removed from an area being cleaned. In some examples, the collection tank 106 is pivotally mounted to the body 104 adjacent the rear of the body 104 and the front of the collection tank 106 lifts off the body 104 and is tilted for dumping the material collected in the collection tank 106.

The rear end of the collection tank 106 includes a pivotally mounted door coupled to the remainder of the collection tank 106.

The boom hose apparatus 200 includes a hose (including a flexible hose 234 as described herein) (also referred to herein as a suction hose or a vacuum hose) that is fluidly connected to the collection tank 106 at one end and is configured to extend down to an area being cleaned. A vacuum pump 110 is provided at the vehicle 100 and configured to create a negative pressure inside of the collection tank 106. The area being cleaned is sucked up with materials, such as debris, through the flexible hose and deposited into the collection tank 106. An example of the boom hose apparatus 200 is further described and illustrated herein.

The boom hose apparatus 200 can be operated by a user via a control panel 112. The control panel 112 provides a boom hose controller 113 configured to receive a user input for operating and controlling the boom hose apparatus 200 (e.g., a boom drive assembly 206 and a hose drive assembly 208 as described herein). The boom hose controller 113 can include one or more physical control elements, such as buttons, switches, levers, selectors, and joysticks. In other examples, the boom hose controller 113 includes electronic control elements. The control panel 112 also provide control elements for operating and controlling other parts, components, and devices of the vehicle 100. Similar to the boom hose controller 113, such other control elements of the control panel 112 can include physical control elements, such as buttons, switches, levers, selectors, and joysticks. In other examples, the control panel 112 includes electronic control elements. For example, the control panel 112 can be integrated with a display device, such as a touch sensitive display screen, and include graphical user interface control elements or widgets.

As described herein, the boom hose apparatus 200 is operated to various positions. The boom hose apparatus 200 may be pivotally connected to the vehicle body 104. For example, The boom hose apparatus 200 is coupled to the boom support structure 108 and pivoted to swing horizontally (side-to-side) and vertically (up and down) over the cab 102 relative to the ground. Example operations of the boom hose apparatus 200 are further described and illustrated with reference to FIGS. 16-18.

Referring to FIGS. 2-9, the boom hose apparatus 200 is illustrated and described in accordance with an exemplary embodiment of the present disclosure. The boom hose apparatus 200 includes a boom assembly 202, a hose assembly 204, a boom drive assembly 206, and a hose drive assembly 208.

The boom assembly 202 includes a plurality of boom sections that are telescopically movable relative to one another. In this example, the boom assembly 202 includes a first boom section 210 and a second boom section 212 that is telescopically movable relative to the first boom section 210. In some examples, the first boom section 210 is configured as a hollow tube so that the second boom section 212 is movably received in the first boom section 210. As illustrated in FIGS. 6 and 7, in some examples, the second boom section 212 is configured to have a smaller cross sectional profile than the first boom section 210 so as to be received in the first boom section 210. The second boom section 212 is movably engaged with the first boom section 210 and can be retracted and extended relative to the first boom section 210 along a longitudinal direction D1. For example, in FIGS. 6 and 8, the boom assembly 202 is in a collapsed state where the second boom section 212 is retracted into the first boom section 210. In FIGS. 7 and 9, the boom assembly 202 is in an extended state (also referred to herein as a telescoped state) where the second boom section 212 is extended out, or telescoped, from the first boom section 210 along the longitudinal direction D1.

The first boom section 210 extends between a rear end 214 (also referred to herein as a proximal end) and a front end 216 (also referred to herein as a distal end), and the rear end 214 of the first boom section 210 can be pivotally coupled to the vehicle body 104 (such as to the boom support structure 108) for horizontal and/or vertical swinging movement over the vehicle cab 102. The front end 216 of the first boom section 210 is open so that the second boom section 212 is movably received in the first boom section 210 therethrough.

As illustrated in FIGS. 8 and 9, the second boom section 212 extends between a rear end 218 (also referred to herein as a proximal end) and a front end 220 (also referred to herein as a distal end). The second boom section 212 is received in the first boom section 210 such that the rear end 218 is received within the first boom section 210 and the front end 220 extends out from the front end 216 of the first boom section 210. As described herein, the front end 220 of the second boom section 212 is configured to mount the hose drive assembly 208.

The telescoping movement of the boom assembly 202 is operated by the boom drive assembly 206. As illustrated in FIGS. 8 and 9, the boom drive assembly 206 can be disposed within the boom assembly 202. The boom drive assembly 206 can operate to drive the second boom section 212 to telescopically move relative to the first boom section 210. In some examples, as illustrated in FIG. 9, the boom drive assembly 206 is engaged with the boom assembly 202 and controlled by a boom drive circuit 203. The boom drive circuit 203 operates to receive a signal representative of a user input from the control panel 112, and control the boom drive assembly 206 based on signal. The boom drive assembly 206 can be of various configurations, such as a retractable shaft assembly that can be hydraulically operated.

In some examples, a conduit 207 can be provided to route hoses and/or cables to the hose drive assembly 208. The conduit 207 can be disposed adjacent the boom assembly 202 and extend at least partially along the length of the boom assembly 202. The conduit 207 can be configured to extend and retract with the boom assembly 202.

The hose assembly 204 is supported by the boom assembly 202. The hose assembly 204 includes a first conduit 230 (also referred to herein as a first tube), a second conduit 232 (also referred to herein as a second tube), and a flexible hose 234.

The first conduit 230 is mounted to the first boom section 210. The first conduit 230 is configured as an open-ended hollow conduit or tube to movably receive the second conduit 232 therein. The first conduit 230 may be made of inflexible material, such as metal or plastic. The first conduit 230 may be secured to the first boom section 210 using one or more brackets, such as a first bracket 240 and a second bracket 242. In this example, the first bracket 240 is provided at a rear end 244 of the first conduit 230, and the second bracket 242 is provided adjacent a front end 246 of the first conduit 230. In some examples, the first bracket 240 fixedly mounts the rear end 244 of the first conduit 230 to the first boom section 210, and the second bracket 242 is configured to be spring loaded to flexibly support the first conduit 230 against the first boom section 210.

The first conduit 230 can be fluidly connected to the collection tank 106 of the vehicle 100 at the rear end 244. In the illustrated example, a bellows tube 250 is used to fluidly connect the rear end 244 of the first conduit 230 to the collection tank 106. In other examples, other element can be used to fluidly couple the first conduit 230 to the collection tank 106. In yet other examples, the first conduit 230 is directly connected to the collection tank 106.

The second conduit 232 is mounted to the second boom section 212 and telescopically movable relative to the first conduit 230 when the second boom section 212 telescopically moves relative to the first boom section 210. In this example, the second conduit 232 is slidably received into the first conduit 230 and can be retracted and extended relative to the first conduit 230 along the longitudinal direction D1. The second conduit 232 is configured as an open-ended hollow conduit or tube so that the flexible hose 234 can pass through the second conduit 232. The second conduit 232 may be made of inflexible material, such as metal or plastic. The second conduit 232 can be secured to the second boom section 212 using one or more brackets. In this example, a third bracket 260 is provided at a front end 264 of the second conduit 232 so that the front end 264 of the third bracket 260 is fixed to the second boom section 212 adjacent the front end 220 of the second boom section 212. Regardless of a position of the second conduit 232 relative to the first conduit 230, a portion of the second conduit 232 adjacent a rear end 262 thereof can be received within the first conduit 230 so that the second conduit 232 is supported at the rear end 262 while the front end 264 of the second conduit 232 is supported by the second boom section 212.

Because the first conduit 230 is secured to the first boom section 210 and the second conduit 232 is secured to the second boom section 212, the telescoping operation of the boom assembly 202 causes a corresponding telescoping movement of the second conduit 232 relative to the first conduit 230. For example, when the boom assembly 202 is in the collapsed state (FIGS. 6 and 8), the second conduit 232 is retracted into the first conduit 230. When the boom assembly 202 is in the extended state (FIGS. 7 and 9), the second conduit 232 is extended from the first conduit 230.

The flexible hose 234 extends between a rearward end 270 and a forward end 272. The rearward end 270 of the flexible hose 234 remains in fluid communication with the collection tank 106, and the forward end 272 of the flexible hose 234 is configured extend down to a service area, such as on the ground or a sewer.

The flexible hose 234 can be received through the second conduit 232 and configured to extend slidably through the second conduit 232. The flexible hose 234 can be slidably extend at least partially from the front end 264 of the second conduit 232 and retract at least partially into the second conduit 232 through the front end 264 thereof. In some examples, the flexible hose 234 can extend through a front end (e.g., an inlet) of the collection tank 106 so that a portion of the hose 234 can be stored in the collection tank 106.

Figure 16:
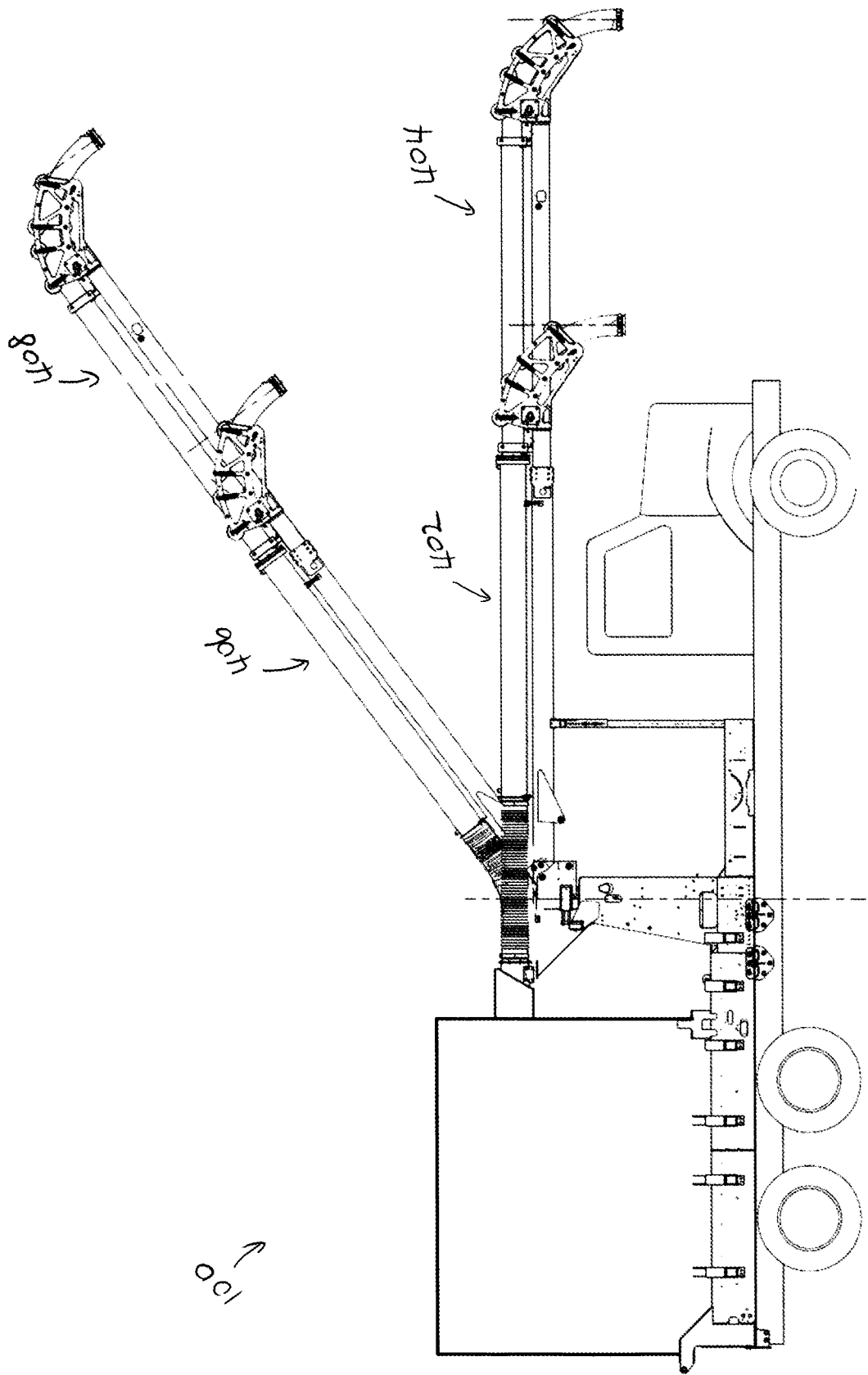
FIG. 16 illustrates various operational states of the boom hose apparatus.
Figure 17:
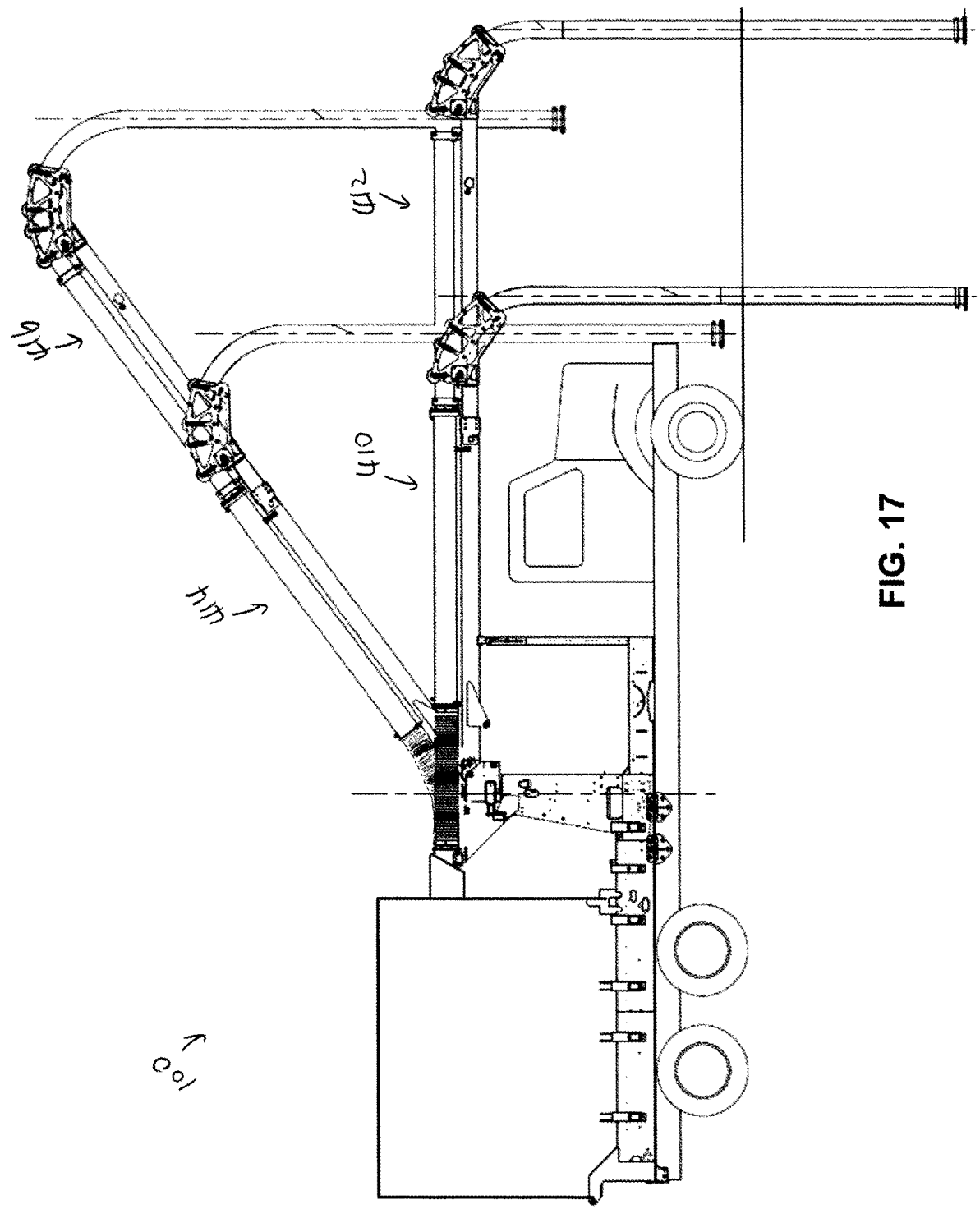
FIG. 17 illustrates other various operational states of the boom hose apparatus.

The flexible hose 234 can be independently operated to extend from, and retract into, the second conduit 232. Regardless of the position of the boom assembly 202 (e.g., either in the collapsed state or the extended state, the flexible hose 234 can be operated to move through the second conduit 232, such as between a retracted position (as illustrated in FIG. 16) or an extended position (as illustrated in FIG. 17).

The flexible hose 234 can be made in various lengths. In some examples, the flexible hose 234 is configured to have a length between the rearward end 270 and the forward end 272 that does not require one or more additional extension hoses to be coupled to the forward end 272 of the flexible hose 234 in most situations. In other examples, the flexible hose 234 is configured to have a length such that the rearward end 270 extends out from the rear end 244 of the first conduit 230 when the flexible hose 234 is in the retracted position.

The hose drive assembly 208 is configured to drive the hose 234 to slide forward or backward through the second conduit 232, thereby adjusting the length of the hose 234 available to accommodate varying distances between the vehicle 100 (e.g., a distal end of the apparatus 200) and the a point of refuse pickup. In some examples, the hose drive assembly 208 is mounted to the second boom section 212 and thus movable together with the second boom section 212 as the second boom section 212 telescopically moves relative to the first boom section 210. In the illustrated example, the hose drive assembly 208 is secured to the front end 220 of the second boom section 212.

In some examples, the flexible hose 234 has a coupling element 252, such as a clamping device, arranged at the forward end 272, which is configured to attach various accessories, such as a metal extension tube or conduit 254.

Figure 10:
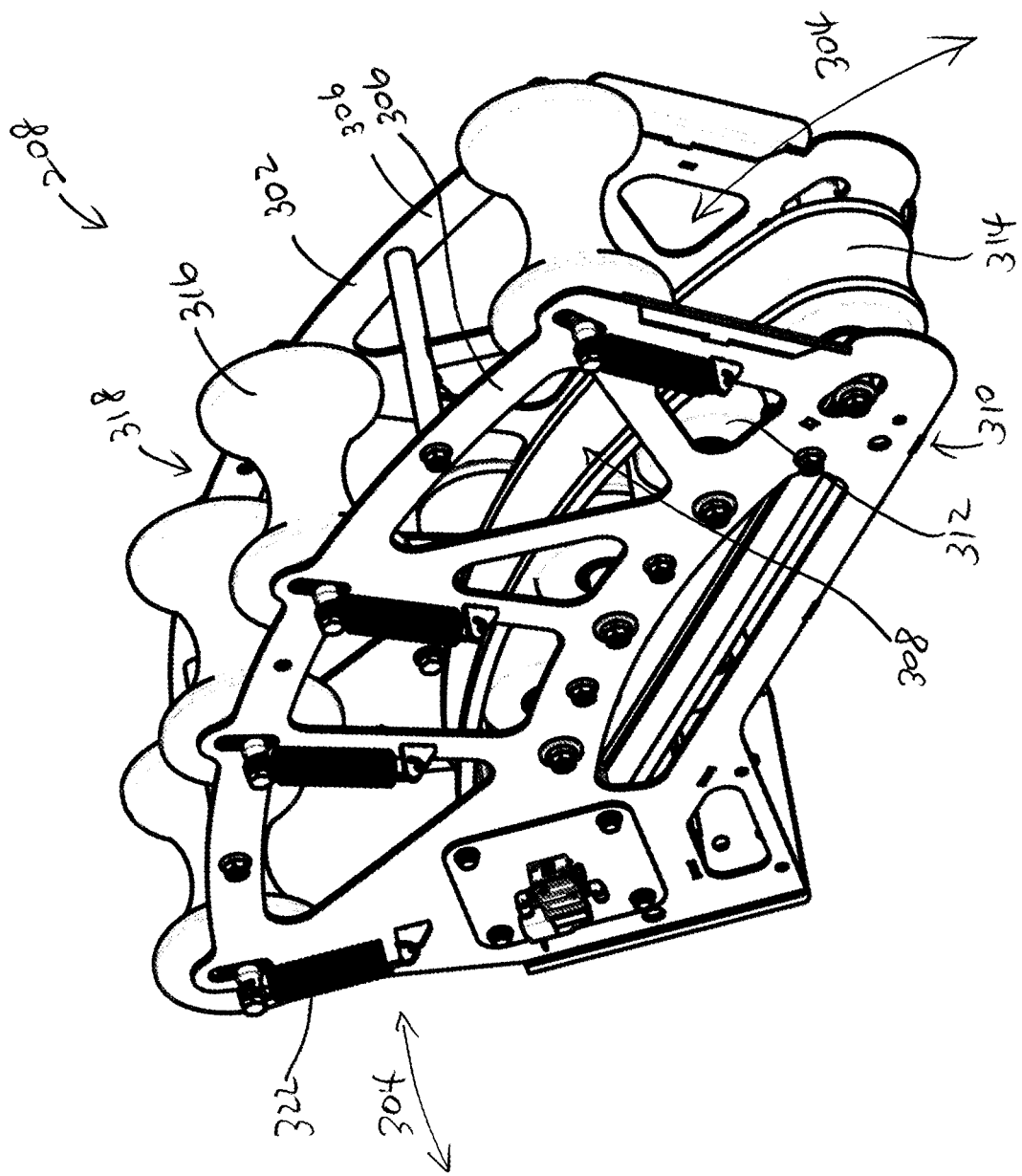
FIG. 10 is a perspective view of an example hose drive assembly.
Figure 11:
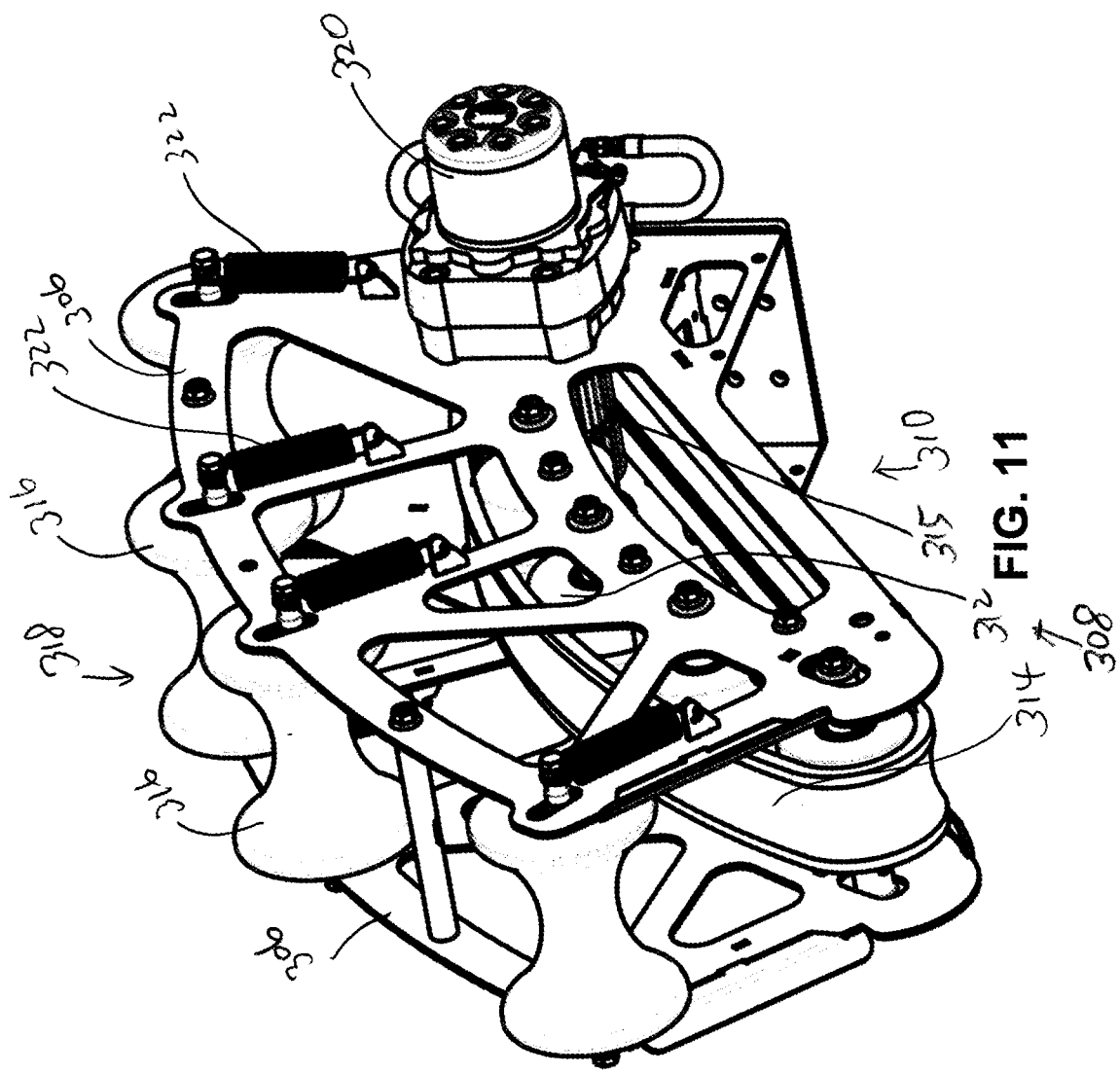
FIG. 11 is another perspective view of the hose drive assembly of FIG. 10.

Referring to FIGS. 10 and 11, an example of the hose drive assembly 208 is further illustrated and described. The hose drive assembly 208 includes a housing 302 secured to the front end 220 of the second boom section 212. In some examples, the housing 302 includes a pair of side members 306 that are spaced apart to define a hose conveyance path 304 therebetween. The flexible hose 234 travels along the hose conveyance path 304.

The hose drive assembly 208 includes a conveyor device 308 arranged in the housing 302 and configured to provide the hose conveyance path 304 thereon. In some examples, the conveyor device 308 is disposed between the pair of side members 306 at a lower side 310 of the housing 302.

The conveyor device 308 may include one or more rollers 312 and a conveyor belt 314. In some examples, the rollers 312 are arranged at the lower side 310 of the housing 302 between the pair of side members 306, and the conveyor belt 314 is trained around the rollers 312 and arranged to travel along the hose conveyance path 304. The conveyor belt 314 is configured to be in frictional engagement with the flexible hose 234 for drawing the hose 234 out or into the second conduit 232 to vary the length of the hose 234 outside the second conduit 232.

In some examples, at least one of the rollers 312 is configured as a drive roller 315 and driven by a drive motor 320. The drive motor 320 can drive the drive roller 315 in reverse directions, so that the conveyor belt 314 travels forwards or backwards along the hose conveyance path 304. The drive motor 320 can be of various types, such as a hydraulic motor, a pneumatic motor, or an electric motor. The drive motor 320 can be connected directly to the drive roller 315, or connected to the drive roller 315 via a transmission device. In other examples, a plurality of motors can be used to drive at least one of the rollers 312.

As described herein, the drive motor 320 is controlled by a hose control circuit 209. The hose control circuit 209 is configured to receive a signal representative of a user input from the control panel 112, and control the drive motor 320 based on the signal.

Although it is described in this example that the boom drive circuit 203 and the hose control circuit 209 are separate, it is understood that the boom drive circuit 203 and the hose control circuit 209 is integrated to a single circuit.

The hose drive assembly 208 can further include one or more idler rollers 316 supported by the housing 302. In some examples, the idler rollers 316 are disposed at an upper side 318 of the housing 302 between the side members 306 and arranged opposite to the conveyor device 308 along the hose conveyance path 304. The hose conveyance path 304 is defined between the conveyor device 308 and the idler rollers 316.

In some examples, the idler rollers 316 are arranged to be biased toward the conveyor device 308 and press the flexible hose 234 against the conveyor device 308. The pressure generated by the idler rollers 316 against the conveyor device 308 increases a friction between the flexible hose 234 and the conveyor belt 314 of the conveyor device 308, thereby improving the travel of the hose 234 along the hose conveyance path 304. The idler rollers 316 can be configured as axially concave rollers to accommodate the round shape of the flexible hose 234. In some examples, one or more spring devices 322 are provided to bias the idler rollers 316 toward the conveyor device 308.

As illustrated, the hose drive assembly 208 is configured to provide an arcuate hose conveyance path 304 such that the flexible hose 234 is naturally flexed by gravity as the hose 234 extends from, or retracts into, the second conduit 232.

Although it is primarily described herein that the conveyor device 308 is arranged at the lower side 310 of the housing 302 and the idler rollers 316 are arranged at the upper side 318 of the housing 302, it is understood that the conveyor device 308 and the idler rollers 316 are arranged in different configurations, such as where the conveyor device 308 is arranged at the upper side 318 of the housing 302 and the idler rollers 316 are arranged at the lower side 310 of the housing 302.

In some examples, a hose end stopper 350 is secured to the rearward end 270 of the flexible hose 234, as illustrated in FIGS. 8 and 9. The hose end stopper 350 is configured to limit movement of the flexible hose 234 relative to the second conduit 232. For example, the hose end stopper 350 is configured to engage with the rear end 262 of the second conduit 232 when the rearward end 270 of the flexible hose 234 reaches the rear end 262 of the second conduit 232. In other examples, the hose end stopper 350 is configured to engage with the front end 264 of the second conduit 232 when the rearward end 270 of the flexible hose 234 reaches the front end 264 of the second conduit 232. Other locations of the second conduit 232 can be configured to engage with the hose end stopper 350 to prevent a forward movement of the flexible hose 234.

Figure 13:
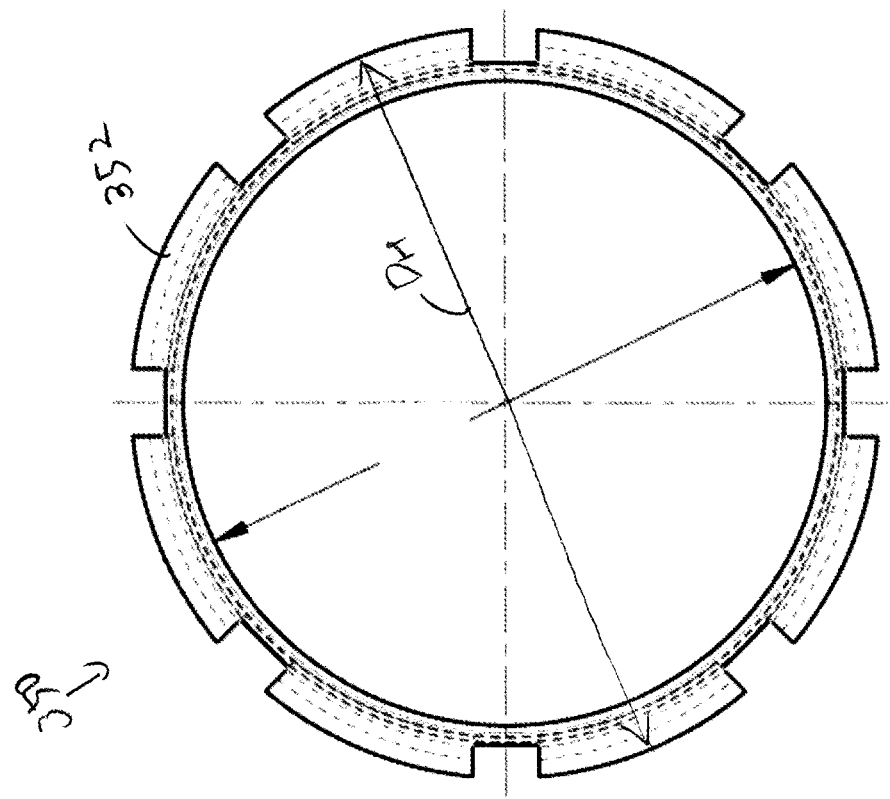
FIG. 13 is a front view of the hose end stopper of FIG. 12.
Figure 12:
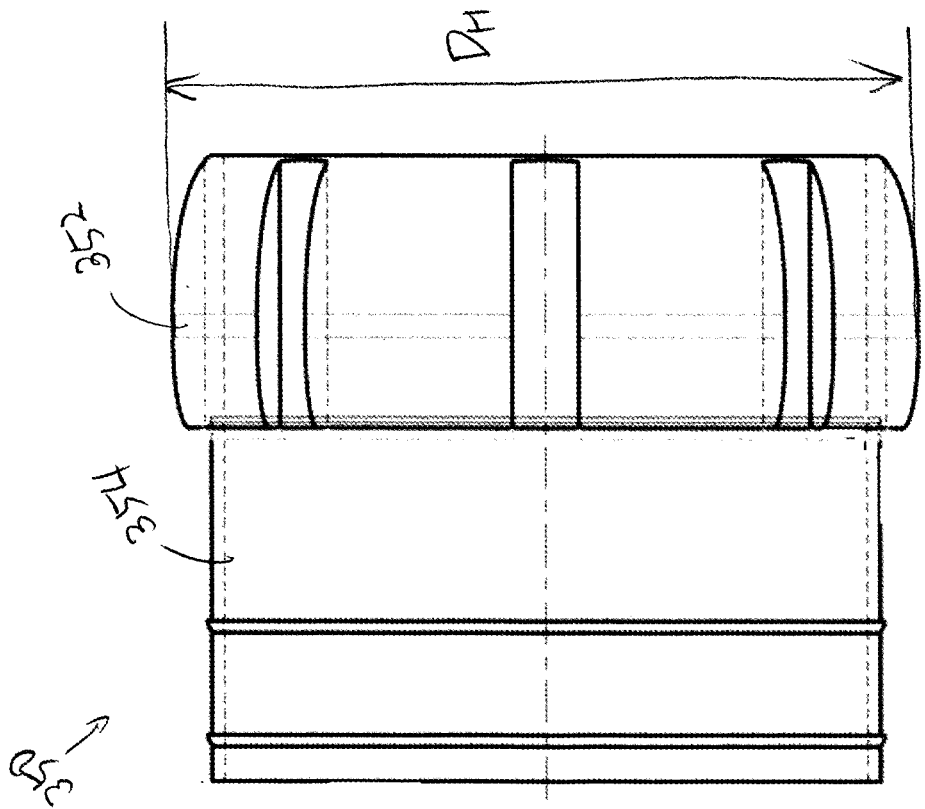
FIG. 12 is a side view of an example hose end stopper.

Referring to FIGS. 12 and 13, an example of the hose end stopper 350 is illustrated and described. The hose end stopper 350 includes a head portion 352 and a hose fit portion 354 extending from the head portion 352. The hose fit portion 354 is configured to fit to the rearward end 270 of the flexible hose 234 so that the head portion 352 seats on the rearward end 270 of the flexible hose 234. The head portion 352 has an external diameter $D_H$ larger than an outer diameter $D_O$ (FIG. 8) of the flexible hose 234 and smaller than an inner diameter $D_I$ of the second conduit 232.

In some examples, the second conduit 232 includes a neck portion 360 having a neck inner diameter $D_N$ smaller than the inner diameter $D_I$ of the second conduit 232. The neck inner diameter $D_N$ (FIG. 8) can be smaller than the external diameter $D_H$ of the head portion 352 of the hose end stopper 350, so that the flexible hose 234 stops traveling when the head portion 352 of hose end stopper 350 engages with the neck portion 360 of the second conduit 232.

The neck portion 360 can be arranged in various locations along the length of the second conduit 232. In the illustrated example, the neck portion 360 is provided at the rear end 262 of the second conduit 232. In this configuration, the flexible hose 234 can be substantially entirely drawn out from the second conduit 232 until the rearward end 270 of the hose 234 engages with the rear end 262 of the second conduit 232. In other examples, the neck portion 360 can be arranged at different locations of the second conduit 232.

The hose end stopper 350 can be secured to the rearward end 270 of the flexible hose 234 in various methods. In some examples, the hose end stopper 350 is molded into the hose 234. In other examples, the hose end stopper 350 is glued to the hose 234. In yet other examples, the hose end stopper 350 is bolted to the hose 234. In yet other examples, the hose end stopper 350 is clamped to the hose 234. In yet other examples, the hose end stopper 350 is injection molded to the hose 234. In yet other examples, the hose end stopper 350 is riveted to the hose 234. In yet other examples, the hose end stopper 350 is screwed to the hose 234. In yet other examples, the hose end stopper 350 is threaded to the hose 234. In yet other examples, the hose end stopper 350 is fastened to the hose 234. In yet other examples, the hose end stopper 350 is threaded and fastened to the hose 234. In yet other examples, the hose end stopper 350 is swaged to the hose 234. In yet other examples, the hose end stopper 350 is interference fitted (e.g., press fitted) to the hose 234. In yet other examples, the hose end stopper 350 is welded to the hose 234. In yet other examples, the hose end stopper 350 is secured to the hose 234 using adhesive.

The hose end stopper 350 allows a simple mechanical stop for movement of the flexible hose 234 in the boom assembly 202 and eliminates the user's concern about an exact point where the operation of the flexible hose 234 should be manually stopped before the flexible hose 234 is accidentally removed from the boom assembly 202. Further, the hose end stopper 350 reduces the effect of erosion during operation as the hose end stopper 350 is flush with the inside the hose. Moreover, there is no fastener or other element in the air stream to be worn off.

Referring again to FIGS. 2-9, the boom hose apparatus 200 can include a hose clamp device 380 configured to selectively enable or disable movement of the flexible hose 234 relative to the second conduit 232. In some examples, the hose clamp device 380 is arranged between the front end 264 of the second conduit 232 and the hose drive assembly 208. For example, the hose clamp device 380 is disposed at the front end 264 of the second conduit 232. The hose clamp device 380 can be secured to the second conduit 232 and/or to the second boom section 212 so that the hose clamp device 380 moves together with the second conduit 232 and the second boom section 212.

Figure 14:
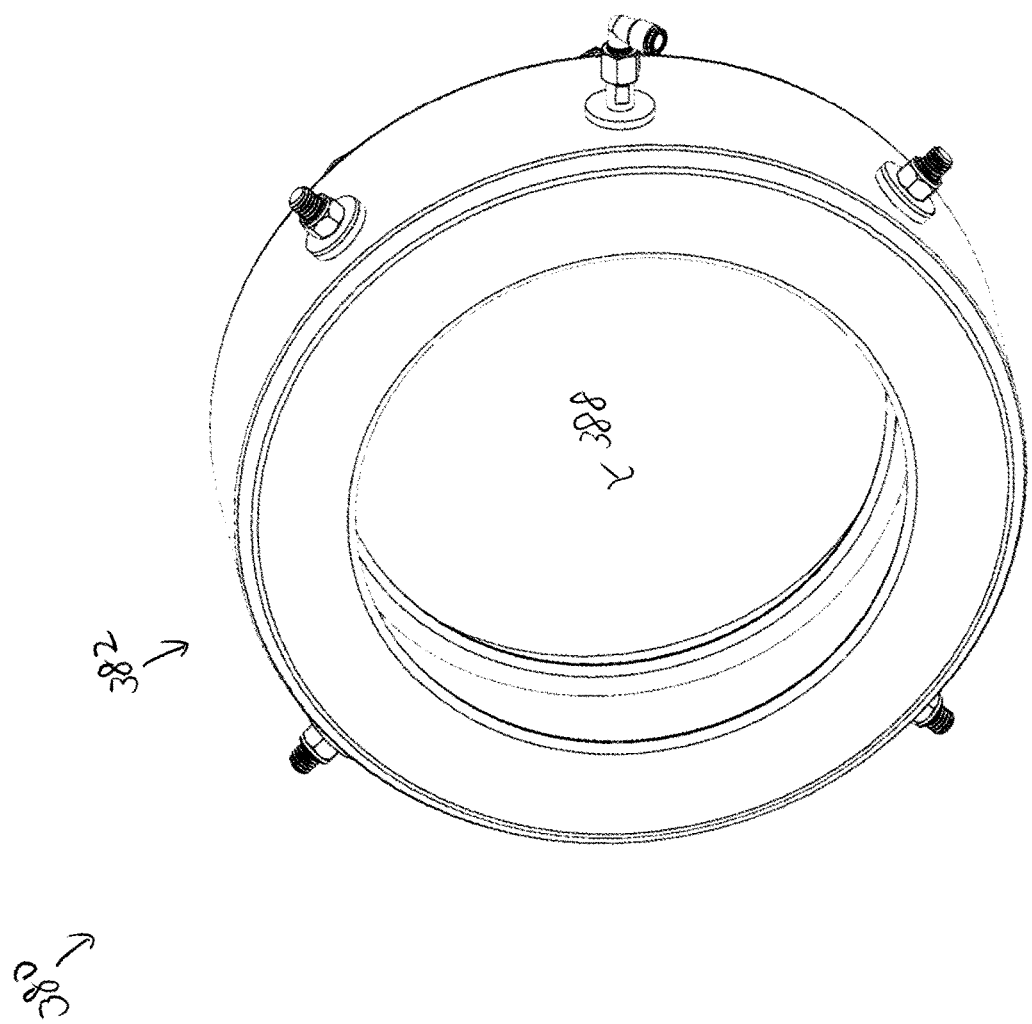
FIG. 14 is a perspective view of an example hose clamp device.
Figure 15:
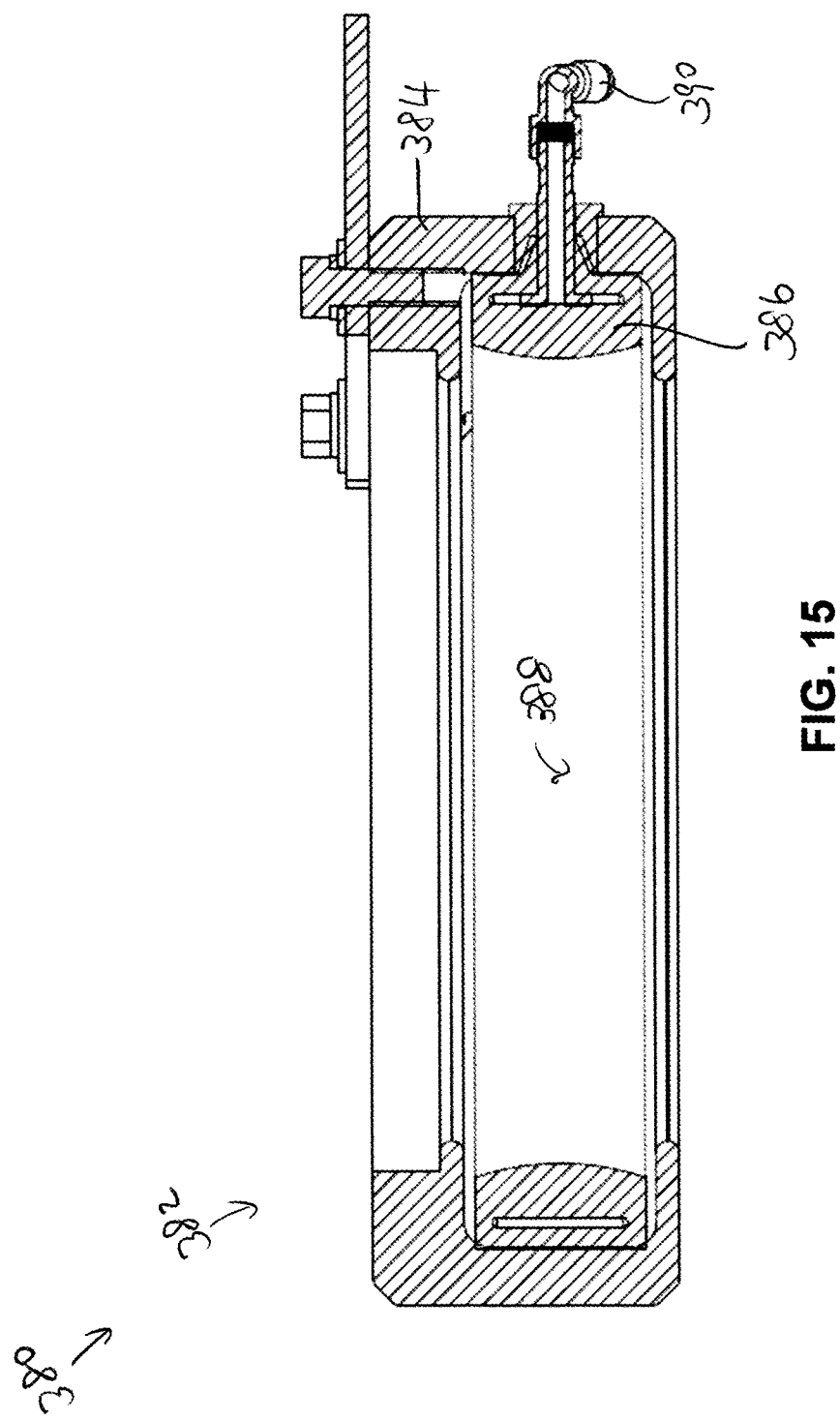
FIG. 15 is a cross sectional view of the hose clamp device of FIG. 14.

Referring to FIGS. 14 and 15, an example of the hose clamp device 380 is illustrated and described. The hose clamp device 380 includes an inflatable bladder 382 configured and arranged to at least partially surround the flexible hose 234. The inflatable bladder 382 can include a ring-shaped housing 384 and an inflatable tube 386 mounted to an inner diameter of the housing 384. The inflatable tube 386 is configured to a circular tube defining a bore 388 through which the flexible hose 234 passes. The inflatable tube 386 inflates and clamps the flexible hose 234 as air is supplied via an inlet 390. As air is drawn via the inlet 390, the inflatable tube 386 deflates and releases the flexible hose 234 so that the flexible hose 234 freely moves through the bore 388.

Figure 18:
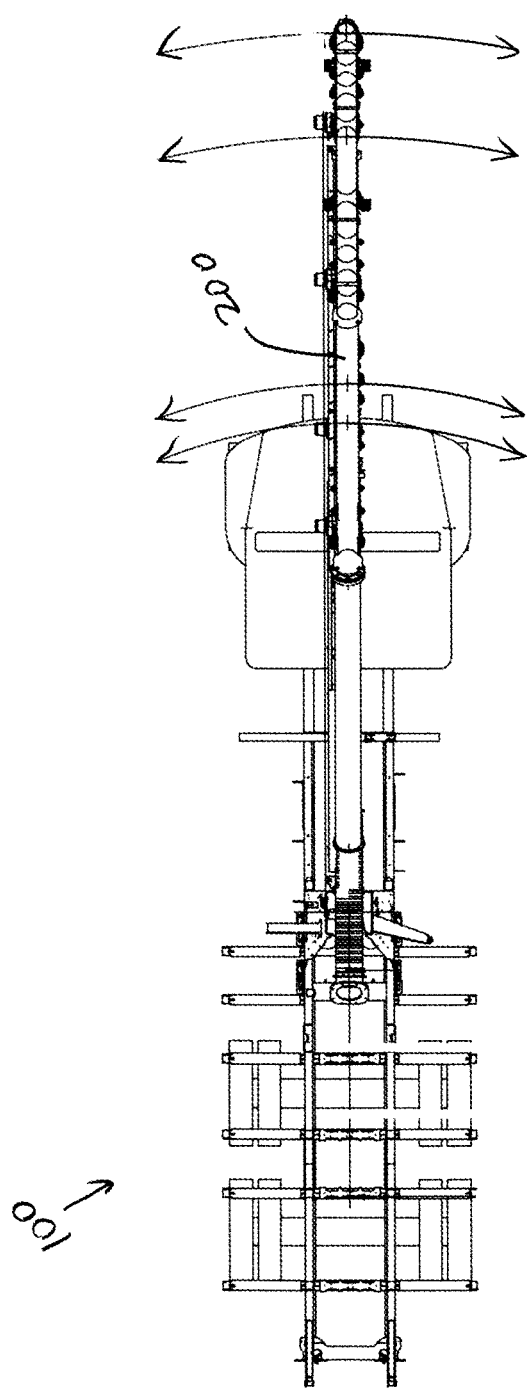
FIG. 18 illustrates yet other various operational states of the boom hose apparatus.

Referring to FIGS. 16-18, example operational states and positions of the boom hose apparatus 200 are illustrated and described. As illustrated in FIG. 16, the boom hose apparatus 200 can be operated to a first operational state 402, a second operational state 404, a third operational state 406, and a fourth operational state 408. In the first operational state 402, the boom hose apparatus 200 is lowered horizontally, the boom assembly 202 is in the collapsed state, and the flexible hose 234 is in the retracted position. In the second operational state 404, the boom hose apparatus 200 is lowered horizontally, the boom assembly 202 is in the extended state, and the flexible hose 234 is in the retracted position. In the third operational state 406, the boom hose apparatus 200 is pivoted up, the boom assembly 202 is in the collapsed state, and the flexible hose 234 is in the retracted position. In the fourth operational state 408, the boom hose apparatus 200 is pivoted up, the boom assembly 202 is in the extended state, and the flexible hose 234 is in the retracted position.

As illustrated in FIG. 17, the boom hose apparatus 200 can be operated to a fifth operational state 410, a sixth operational state 412, a seventh operational state 414, and an eighth operational state 416. In the fifth operational state 410, the boom hose apparatus 200 is lowered horizontally, the boom assembly 202 is in the collapsed state, and the flexible hose 234 is in the extended position. In the sixth operational state 412, the boom hose apparatus 200 is lowered horizontally, the boom assembly 202 is in the extended state, and the flexible hose 234 is in the extended position. In the seventh operational state 414, the boom hose apparatus 200 is pivoted up, the boom assembly 202 is in the collapsed state, and the flexible hose 234 is in the extended position. In the eighth operational state 416, the boom hose apparatus 200 is pivoted up, the boom assembly 202 is in the extended state, and the flexible hose 234 is in the extended position.

As such, the flexible hose 234 can be operated independently from the states of the boom assembly 202. Regardless of the length of the second conduit 232 telescoped out from the first conduit 230, the same amount of the flexible hose 234 remains available to be driven out from the second conduit 232. As such, according to the boom hose apparatus 200 of the present disclosure, the amount of the flexible hose 234 does not decrease as the boom assembly 202 is telescoped out, and thus the operator can take full advantage of both the telescoping of the boom assembly and the extension of the flexible hose length.

As illustrated in FIG. 18, the boom hose apparatus 200 can also be operated to pivot to swing horizontally (side-to-side) over the cab 102 relative to the ground. The boom hose In each of the horizontal positions, the boom hose apparatus 200 can be operated to any of the first, second, third, fourth, fifth, sixth, seventh, and eighth operational states 402, 404, 406, 408, 410, 412, 414, and 416.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A boom hose apparatus for a vehicle, the boom hose apparatus comprising:
    a boom assembly including a first boom section and a second boom section telescopically movable relative to the first boom section; and
    a hose assembly supported on the boom assembly, the hose assembly including:
        a first conduit mounted to the first boom section and fluidly connected to a collection tank of the vehicle;
        a second conduit mounted to the second boom section and telescopically movable relative to the first conduit as the second boom section telescopically moves relative to the first boom section; and
        a flexible hose received through the second conduit and configured to slidably extend at least partially from the second conduit or retract at least partially into the second conduit.

2. The boom hose apparatus of claim 1, further comprising a hose drive assembly configured to drive the flexible hose to extend from the second conduit or retract into the second conduit, the hose drive assembly mounted to the second boom section and movable along with the second boom section as the second boom section telescopically moves relative to the first boom section.

3. The boom hose apparatus of claim 2, wherein the hose drive assembly includes:
    a housing secured to a front end of the second boom section;
    a conveyor device arranged in the housing and configured to provide a hose conveyance path along which the flexible hose moves; and
    a drive motor mounted to the housing and driving the conveyer device.

4. The boom hose apparatus of claim 3, wherein the hose drive assembly further includes:
    one or more idler rollers supported by the housing and arranged opposite to the conveyor device along the hose conveyance path, the idler rollers being biased toward the conveyor device to bias the flexible hose against the conveyor device.

5. The boom hose apparatus of claim 1, further comprising a boom drive assembly configured to drive the second boom section to telescopically move relative to the first boom section.

6. The boom hose apparatus of claim 1, further comprising a hose end stopper secured to a rearward end of the flexible hose and engageable with a front end of the second conduit to limit movement of the flexible hose relative to the second conduit.

7. The boom hose apparatus of claim 6, wherein the second conduit has a conduit inner diameter and has a neck portion having a neck inner diameter, the neck inner diameter smaller than the conduit inner diameter, and
    wherein the hose end stopper includes a head portion and a hose fit portion fitted at the rearward end of the flexible hose, the head portion having an external diameter larger than an outer diameter of the flexible hose, the external diameter of the head portion being smaller than the conduit inner diameter of the second conduit and greater than the neck inner diameter of the second conduit.

8. The boom hose apparatus of claim 1, further comprising a hose clamp device that selectively enables or disable movement of the flexible hose relative to the second conduit.

9. The boom hose apparatus of claim 8, wherein the hose clamp device is arranged at a front end of the second conduit.

10. The boom hose apparatus of claim 8, wherein the hose clamp device includes an inflatable bladder arranged to at least partially surround the flexible hose.

11. A vehicle comprising:
    a collection tank;
    a boom hose apparatus including a boom assembly and a hose assembly, the boom assembly including a first boom section and a second boom section telescopically movable relative to the first boom section, and the hose assembly supported on the boom assembly and including:
- a first conduit mounted to the first boom section and fluidly connected to a collection tank of the vehicle;
- a second conduit mounted to the second boom section and telescopically movable relative to the first conduit as the second boom section telescopically moves relative to the first boom section; and
- a flexible hose received through the second conduit and configured to slidably extend at least partially from the second conduit or retract at least partially into the second conduit;
- a boom drive assembly configured to drive the second boom section to telescopically move relative to the first boom section;
- a hose drive assembly configured to drive the flexible hose to extend from the second conduit or retract into the second conduit; and
- a boom hose controller configured to receive a user input for controlling the boom driver and the hose drive assembly.

12. The vehicle of claim 11, wherein the hose drive assembly is mounted to the second boom section and movable along with the second boom section as the second boom section telescopically moves relative to the first boom section.

13. The vehicle of claim 11, wherein the hose drive assembly includes:
- a housing secured to a front end of the second boom section;
- a conveyor device arranged in the housing and configured to provide a hose conveyance path along which the flexible hose moves; and
- a drive motor mounted to the housing and driving the conveyer device.

14. The vehicle of claim 13, wherein the hose drive assembly further includes:
- one or more idler rollers supported by the housing and arranged opposite to the conveyor device along the hose conveyance path, the idler rollers being biased toward the conveyor device to bias the flexible hose against the conveyor device.

15. The vehicle of claim 11, further comprising a hose end stopper secured to a rearward end of the flexible hose and engageable with a front end of the second conduit to limit movement of the flexible hose relative to the second conduit.

16. The vehicle of claim 15, wherein the second conduit has a conduit inner diameter and has a neck portion having a neck inner diameter, the neck inner diameter smaller than the conduit inner diameter, and
wherein the hose end stopper includes a head portion and a hose fit portion fitted at the rearward end of the flexible hose, the head portion having an external diameter larger than an outer diameter of the flexible hose, the external diameter of the head portion being smaller than the conduit inner diameter of the second conduit and greater than the neck inner diameter of the second conduit.

17. The vehicle of claim 11, further comprising a hose clamp device that selectively enables or disable movement of the flexible hose relative to the second conduit.

18. The vehicle of claim 17, wherein the hose clamp device is arranged at a front end of the second conduit.

19. The vehicle of claim 17, wherein the hose clamp device includes an inflatable bladder arranged to at least partially surround the flexible hose.

20. The vehicle of claim 11, wherein the boom hose apparatus is connected to a body of the vehicle and pivotable horizontally and vertically relative to the vehicle.

* * * * *